United States Patent
Ivanov et al.

(10) Patent No.: US 9,384,364 B1
(45) Date of Patent: Jul. 5, 2016

(54) SYSTEM AND METHOD OF CONTROLLING ACCESS OF A NATIVE IMAGE OF A MACHINE CODE TO OPERATING SYSTEM RESOURCES

(71) Applicant: AO Kaspersky Lab, Moscow (RU)

(72) Inventors: Dmitry G. Ivanov, Moscow (RU); Nikita A. Pavlov, Moscow (RU); Dmitry V. Shvetsov, Moscow (RU); Mikhail A. Gorshenin, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 14/811,135

(22) Filed: Jul. 28, 2015

(30) Foreign Application Priority Data

Mar. 31, 2015 (RU) .................................. 2015111422

(51) Int. Cl.
*G06F 21/62* (2013.01)

(52) U.S. Cl.
CPC ........ *G06F 21/6218* (2013.01); *G06F 21/6209* (2013.01)

(58) Field of Classification Search
CPC .................................................. G06F 21/6218
See application file for complete search history.

(56) References Cited

U.S. PATENT DOCUMENTS

| | | | | |
|---|---|---|---|---|
| 5,579,478 A * | 11/1996 | Heiserman | .......... | G06F 21/6218 726/4 |
| 6,199,181 B1 * | 3/2001 | Rechef | .................... | G06F 21/53 714/38.13 |
| 7,395,394 B2 * | 7/2008 | Federa | ................ | G06F 12/1425 711/152 |
| 8,621,647 B1 * | 12/2013 | Tinnes | .................... | G06F 21/57 726/27 |
| 9,053,108 B2 * | 6/2015 | Biskeborn | ......... | G06F 17/30067 |
| 2007/0186070 A1 * | 8/2007 | Federa | ................ | G06F 12/1425 711/163 |
| 2012/0157049 A1 * | 6/2012 | Eliovits | ................... | H04L 63/10 455/411 |
| 2014/0208426 A1 | 7/2014 | Natarajan et al. | | |
| 2014/0222876 A1 * | 8/2014 | Biskeborn | ......... | G06F 17/30067 707/822 |
| 2015/0347774 A1 * | 12/2015 | Krstic | ................. | G06F 21/6218 726/29 |
| 2016/0048409 A1 * | 2/2016 | Briel | ................... | G06F 9/45558 718/1 |

OTHER PUBLICATIONS

Denning; A lattice model of secure information flow; Published in: Magazine Communications of the ACM CACM Homepage archive; vol. 19 Issue 5, May 1976; pp. 236-243; ACM Digital Library.*
Sandhu et al.; Access control: principle and practice; Published in: IEEE Communications Magazine (vol. 32 , Issue: 9 ); pp. 40-48; Date of Publication: Sep. 1994; IEEE Xplore.*

* cited by examiner

*Primary Examiner* — Bradley Holder
(74) *Attorney, Agent, or Firm* — Arent Fox LLP; Michael Fainberg (57) ABSTRACT

Disclosed is a system and method for controlling access of a native image of a machine code to resources of an operating system of a device. An example method includes obtaining the native image of the machine code; identifying a parent assembly from which the native image was created; determining a category of trust of the parent assembly; determining a category of trust of the native image based on the category of trust of the parent assembly; and restricting access of the native image that has an untrusted category of trust to the resources of the operating system of the device.

15 Claims, 8 Drawing Sheets

SYSTEM AND METHOD OF CONTROLLING ACCESS OF A NATIVE IMAGE OF A MACHINE CODE TO OPERATING SYSTEM RESOURCES

CROSS-REFERENCE TO RELATED APPLICATIONS

This application claims benefit of priority under 35 U.S.C. 119(a)-(d) to a Russian Application No. 2015111422 filed on Mar. 31, 2015, which is incorporated by reference herein

FIELD OF TECHNOLOGY

The disclosure relates to the field of computer science, and more specifically, to a system and method for controlling access of a native image of a machine code to resources of an operating system of a computer device.

BACKGROUND

Currently, the number of software applications that may be installed on user devices (e.g., personal computer, smartphone, tablet, etc.) is growing significantly and the number of files that may be created by these applications is rising exponentially. Certain files which are created by the software applications upon installation and operation of the application are unique, i.e., the files may exist as a single copy. It is very difficult to categorize such files without performing a detailed analysis of their contents.

Often, these files can be images of parent assemblies in machine code (i.e., native images), which are part of the .NET technology. A .NET application may be created using a certain number of assemblies together, where an assembly is a binary file serviced by a Common Language Runtime ("CLR") environment. A .NET assembly includes the following metadata elements:

a portable execution ("PE") file header;
a CLR header;
Common Intermediate Language ("CIL") code;
metadata used in the assembly of types (e.g., classes, interfaces, structures, enumerations, delegates);
a manifest of the assembly; and
additional built-in resources.

In general, the PE header identifies that the assembly can be loaded and executed in operating systems of the Windows® family. The PE header also identifies the type of application (e.g., console application, application with graphic user interface, code library and the like).

The CLR header constitutes data that can support all .NET assemblies so that they can be maintained in the CLR environment. The CLR header contains such data as flags, CLR versions, entry point (e.g., in a particular instance, the address for the beginning of the function Main( )), which allows the executing environment to determine the makeup of the file being managed (i.e., a file containing managed code).

Each assembly contains CIL code, which is an intermediate code not dependent on the processor. During execution, the CIL code is compiled in real time mode by a JIT (just in time, i.e., dynamic compilation) compiler into instructions corresponding to the requirements of the specific processor.

In any given assembly, there is also metadata that fully describes the format of the types (e.g., classes, interfaces, structures, enumerations, delegates, etc.) present within the assembly, as well as external types to which the assembly makes reference (i.e., types described in other assemblies). In the executable environment, the metadata is used to determine the location of types on in the binary file, for the placement of the types in memory, and to simplify the process of a remote call for the methods of the types.

The assembly may also contain a manifest, which describes each module making up the assembly, the version of the assembly, and also any external assemblies to which the current assembly makes reference. The manifest also contains all metadata needed to specify the requirements of the assembly for versions and the identity of the assembly, as well as all the metadata needed to determine the scope of the assembly and to allow links to resources and classes. The following table shows the data contained in the manifest of an assembly. The first four elements—name of the assembly, version number, language and regional parameters, as well as the strong name data—constitute the identity of the assembly.

| Information | Description |
|---|---|
| Name of Assembly | Text line giving the name of the assembly. |
| Version Number | Main and supplemental version numbers, revision number and build number. The CLR environment uses them to apply the version management policy. |
| Language and Regional Parameters | Information on languages or regional parameters supported by the assembly. This information should be used only to designate the assembly as an accompanying assembly containing information about the language or regional parameters (an assembly containing information about language and regional parameters is automatically considered an accompanying assembly). |
| Strong Name Data | The publisher's public key, if a strong name is assigned to the assembly. |
| List of All Ffiles of the Assembly | Hash and name of each file making up the assembly. All files entering into the assembly should be located in the same folder as the file with the manifest of the assembly. |
| Information on Links to Types | Information used by the execution environment to compare the links to types with the files containing their declarations and implementations. This involves types which are exported by the assembly. |
| Information on Links to Assemblies | A list of other assemblies for which there are static links from the given assembly. Each link includes the name of the dependent assembly, the metadata of the assembly (version, language and regional parameters, operating system, etc.) and the public key, if the assembly has a strong name. |

Any .NET assembly may contain any given number of embedded resources, such as application icons, graphic files, audio fragments or string tables.

An assembly can consist of several modules. A module is a part of an assembly, i.e., a logical collection of code or resources. The hierarchy of entities used in the assembly is: assembly>module>type (classes, interfaces, structures, enumerations, delegates)>method. A module can be internal (i.e., inside a file of the assembly) or external (i.e., a separate file). A module does not have an entry point, nor does it have any individual version number, and therefore it cannot be loaded directly by the CLR environment. Modules can only be loaded by the main module of the assembly, such as a file containing the manifest of the assembly. The manifest of the module contains only an enumeration of all external assemblies. Each module has a Module Version Identifier ("MVID"), which is a unique identifier written out in each module of the assembly, which changes during each compilation.

Figure 1A:
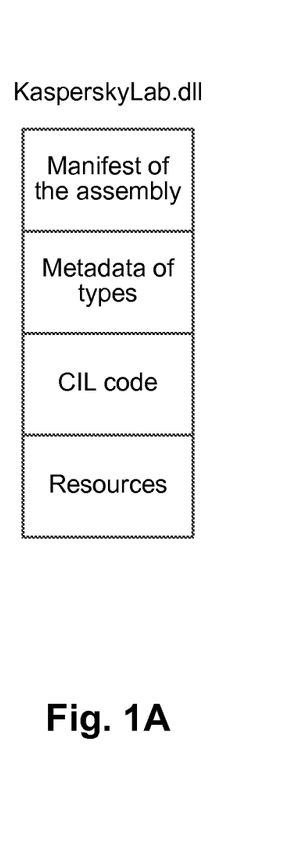
FIG. 1a illustrates an exemplary layout of a single-file assembly.

FIG. 1A illustrates an exemplary layout of a single-file assembly. As shown, in single-file assemblies, all requirement elements (e.g., headers, CIL code, metadata of types, the manifest and resources) are situated inside a single file *.exe or *.dll.

Figure 1B:
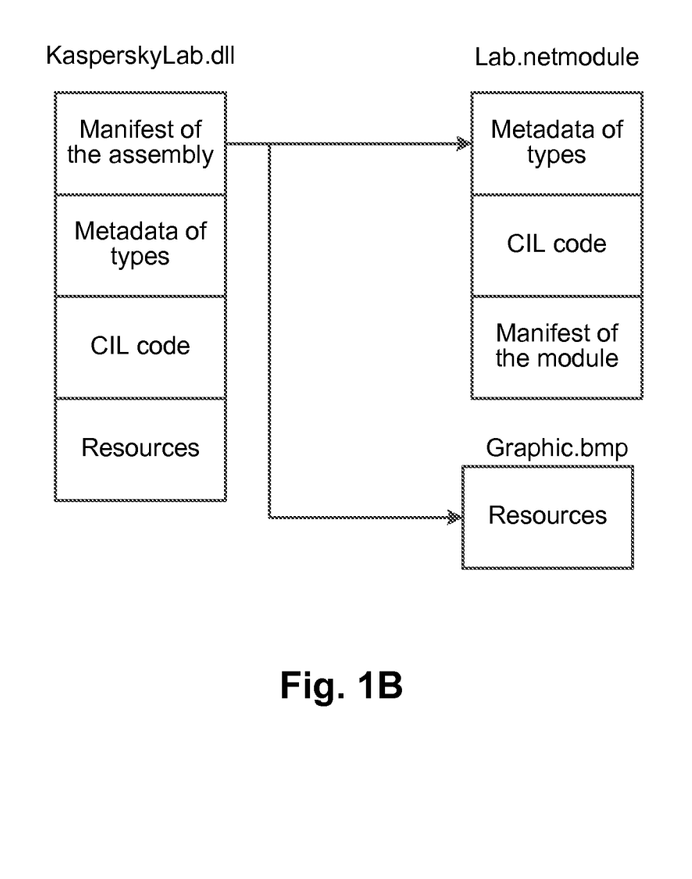
FIG. 1b illustrates an example of a multiple-file assembly.

FIG. 1B illustrates an example of a multiple-file assembly. A multiple-file assembly consists of a set of .NET modules that are deployed in the form of a single logical unit and provided with the same version number. Typically, one of these modules is called the main module and contains the manifest of the assembly and also may contain all necessary CIL instructions, metadata, headers and additional resources.

The manifest of the main module describes all the other related modules on which the operation of the main module depends. The secondary modules in a multiple-file assembly may be assigned the extension *.netmodule. The secondary *.netmodule modules also contain CIL code and metadata of types, as well as a manifest of the level of the module, in which the external assemblies needed by the given module are enumerated.

As with any PE file, an assembly can be signed with a digital signature (e.g., an X.509) that is situated in the overlay of the PE file or digitally-signed catalog file (.cat). A Strong-Name signature is used in addition or separately, i.e., a hash generated by using the contents of the assembly and the RSA private key. The hash is situated in the assembly between the PE header and the metadata. The hash makes it possible to check for no change in the assembly since the time when it was compiled. For a single-file assembly, free bytes are left after the PE header when the file is compiled. The hash of the file is then calculated using the private key and the resulting hash is entered into these available bytes.

The technology is different for multiple-file assemblies. Besides the hash of the main file of the assembly, hashes are also calculated for the external modules, after which the data is entered into the main assembly. The modules do not have their own signatures and they have different MVIDs from the main module. The following items are entered into manifest of the assembly:
  the PublicKey—i.e., the public key of the StrongName signature, and
  the PublicKeyToken—i.e., the hash of the public part of the key of the StrongName signature.

Typically, assemblies are divided into: private and public/shared. Private assemblies should always be located in the same catalog as the client application in which they are used (i.e., the application catalog) or in one of its subcatalogs.

In contrast, a public assembly can be used at the same time in several applications on the same device. Public assemblies are not situated inside the same catalog as the applications in which they are supposed to be used. Instead, they can be installed in a global assembly cache (GAC). The GAC can be located in several places at the same time as shown in the following table:

| Path to GAC | .NET Framework version | Assembly word length |
|---|---|---|
| %WINDIR%\assembly\GAC | 1.x | — |
| %WINDIR%\assembly\GAC_32 | 2.x-3.x | x32 |
| %WINDIR%\assembly\GAC_64 | 2.x-3.x | x64 |
| %WINDIR%\assembly\GAC_MSIL | 2.x-3.x | AnyProcessor |
| %WINDIR%\Microsoft.NET\assembly\GAC_32 | 4.x and higher | x32 |
| %WINDIR%\Microsoft.NET\assembly\GAC_64 | 4.x and higher | x64 |
| %WINDIR%\Microsoft.NET\assembly\GAC_MSIL | 4.x and higher | AnyProcessor |

An assembly being installed in a GAC should have a strong name. A strong name is the modern-day .NET equivalent of the global unique identifier (GUID) that was used in COM. Unlike the GUID values in COM, which are 128-bit numbers, the .NET strong names are based in part on two interrelated cryptographic keys, known as a public key and a secret (private) key.

A strong name consists of a set of interrelated data, including, at least:
  the name of the assembly (being the name of the assembly without the file extension).
  the version number of the assembly;
  the public key value;
  a value designating the region, which is not mandatory and can be used for localization of the application; and
  the digital signature created with use of the hash obtained from the contents of the assembly and the value of the private key.

In order to create the strong name of an assembly, a user can obtain the public and private key, for example, the data of the public and private keys is generated by the utility sn.exe, provided as part of the .NET Framework SDK. This utility generates a file containing data for two different, yet mathematically related keys—the public and private keys. The locations of this file are then indicated to the compiler, which writes the full value of the public key in the manifest of the assembly.

In a particular case, the compiler generates on the basis of the entire content of the assembly (e.g., CIL code, metadata, etc.) a corresponding hash. The hash is a numerical value that is statistically unique to fixed input data. Consequently, in the event of a change in any data of a .NET assembly (even a single character in a string literal), the compiler will generate a different hash. The generated hash then combines with the private key data contained inside the file to obtain the digital signature, inserted in the assembly inside the CLR header data.

Figure 1C:
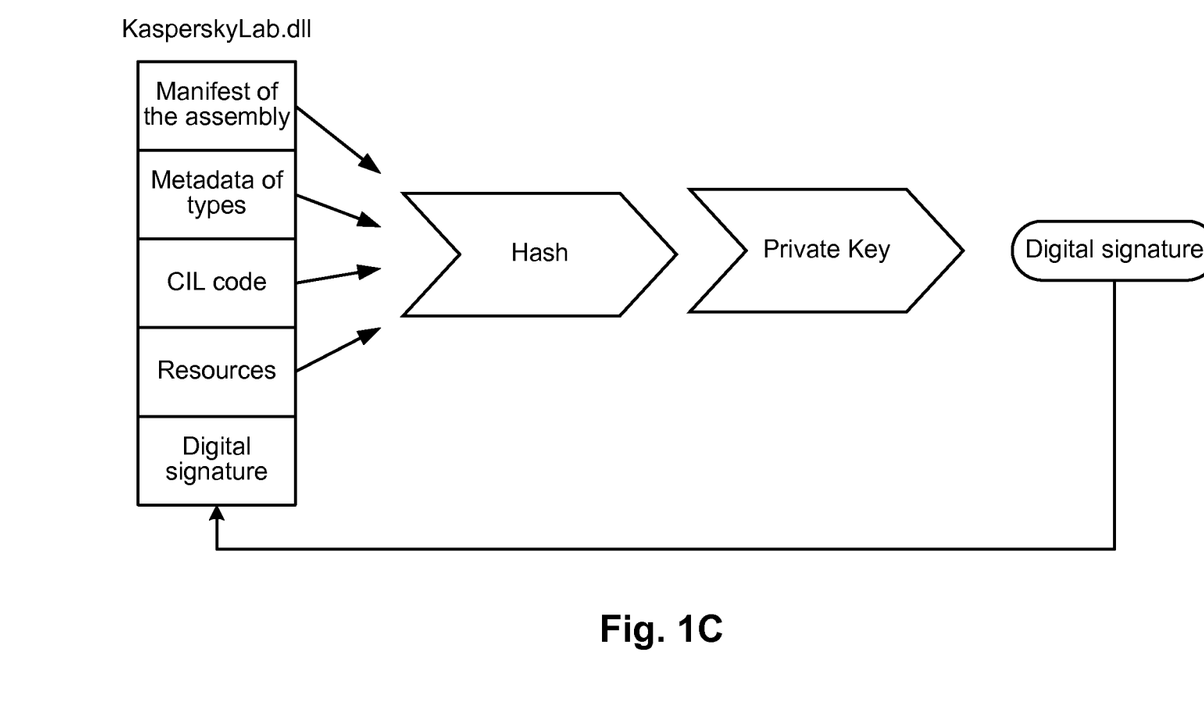
FIG. 1c illustrates an exemplary process for generating a strong name.

FIG. 1C illustrates an exemplary process for generating a strong name. Typically, the private key data is not indicated in the manifest, but used only to identify the content of the assembly by the digital signature (along with the generated hash). After completing the process of creating and assigning a strong name, the assembly can be installed in the GAC.

The path to the assembly in the GAC can be, for example:
  C:\Windows\assembly\GAC_32\KasperskyLab\2.0.0.0_b03f5f7f11d50a3a\KasperskyLab.dll, where:
  C:\Windows\assembly is the path to the GAC;
  \GAC_32—is the GAC_architecture of the processor;
  \KasperskyLab is the name of the assembly;
  \2.0.0.0_b03f5f7f11d50a3a is the version of the assembly_public key marker; and
  KasperskyLab.dll is the \assembly name.extension.

The execution of the code of an assembly, in one particular case, occurs as follows. First, the PE header is analyzed to determine which process should be started (32 or 64 bit). Next, the selected file version MSCorEE.dll is loaded (C:\Windows\System32\MSCorEE.dll for 32-bit systems). An example of the source code of an assembly is presented as follows:

```
static void Main( )
{
  System.Console.WriteLine("Kaspersky");
  System.Console.WriteLine("Lab");
}
```

For the execution of the method (for convenience, the code is presented in its original form, and not compiled into CIL code), such as the method System.Console.WriteLine ("Kaspersky"), the JIT compiler transforms the CIL code into machine commands.

Figure 2:
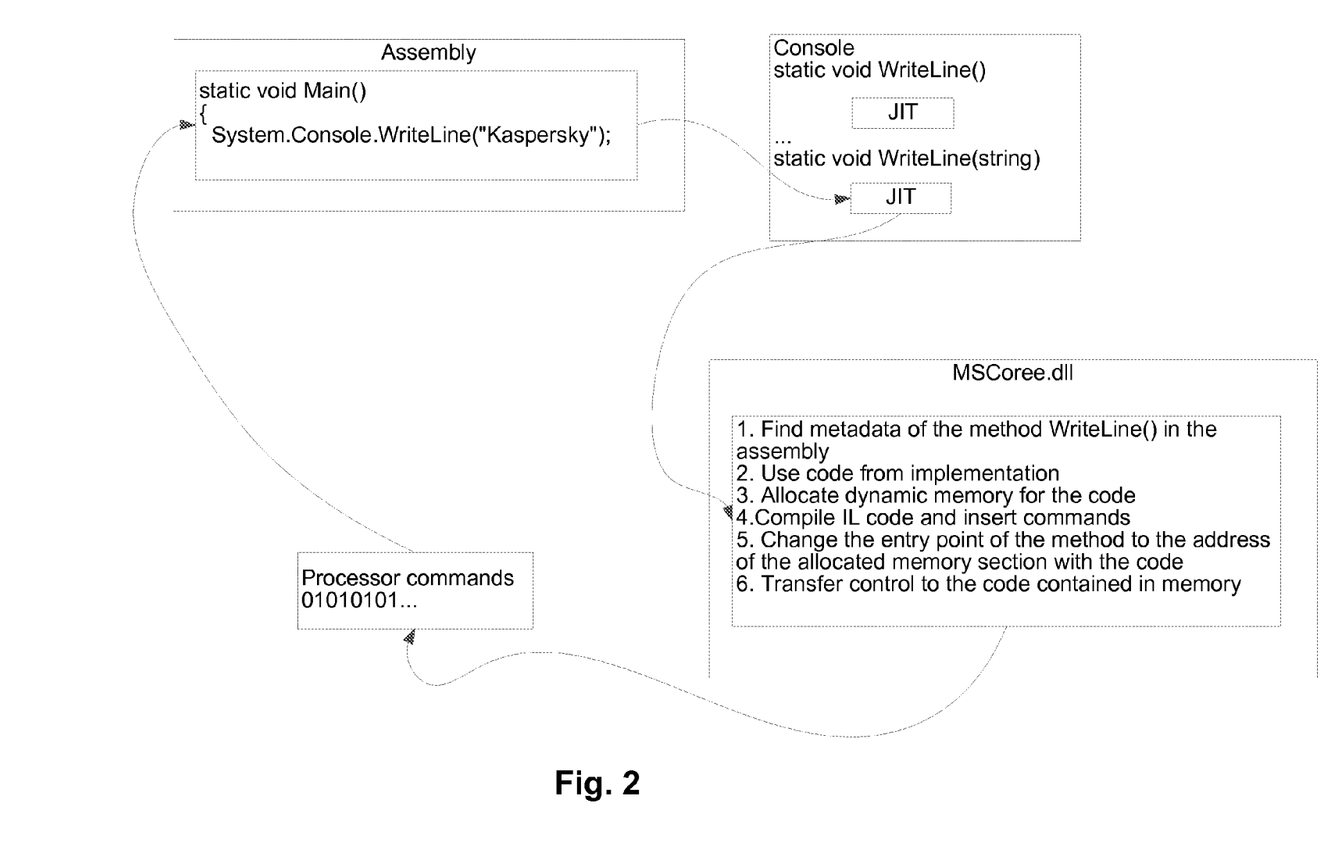
FIG. 2 illustrates an exemplary method of executing an assembly code.

FIG. 2 illustrates an exemplary method of executing an assembly code. Initially, before executing the function Main( ), the CLR environment finds all the declared types (classes) (for example, the type Console). Next, the CLR environment determines the methods, combining them in a record inside a unified "structure" (one method each, as defined in the type Console). The entries contain the addresses at which the implementations of the methods can be found. At the first accessing of the method WriteLine, the JIT compiler is called up. The JIT compiler is aware of the method being called up and the type which defines this method. Once called up, the JIT compiler searches in the metadata of the corresponding assembly for the implementation of the method code (i.e., the code implementing the method WriteLine(string str)). The JIT compiler then compiles the CIL code into machine code and saves the compiled code in dynamic memory. Next, the JIT compiler returns to the internal "structure" of the type data (Console) and replaces the address of the method being called up with the address of the memory section with the machine code. The method Main( ) again accesses the method WriteLine(string str). Since the code has already been compiled, the access is without a JIT compiler call. After executing the method WriteLine(string str) control returns to the method Main( ).

It follows from the description that the function works "slowly" only at the time of the first call, when the JIT compiler is converting the CIL code into processor instructions. In all other instances, the code is already in memory and is provided as optimized for the given processor. However, if yet another program is started in another process, the JIT compiler will be called up again for this same method.

The native images mentioned above solve the problem of slow working of the function at the time of the first call. When the assembly is loaded, an image will be loaded from which the machine code will be executed. Using this technology, it is possible to speed up the loading and running of an application because the JIT compiler does not need to compile anything and/or also create the data structures each time again. All of this is taken from the image. An image can be created for any given .NET assembly regardless of whether or not it is installed in the GAC. For the compilation, in one example, one uses the utility ngen.exe, located by the path %WINDIR%\Microsoft.NET\Framework\<Framework_version>\ngen.exe. When ngen.exe is launched, machine code is created for the CIL code of the assembly using the JIT compiler, and the result is saved to disk in the Native Image Cache ("NIC"). The compilation is done on the local device, taking into account its software and hardware configuration, and, therefore, the image should be used only in the environment for which it was compiled. The purpose of creating such images is to increase the effectiveness of the managed applications, that is, the finished assembly in machine code is loaded in place of the JIT compilation.

If the code of the assembly is used by many applications, the creation of an image substantially increases the speed of launching and executing the application, since the image can be used by many applications at the same time, while the code generated on the fly by the JIT compiler is used only by the copy of the application for which it is being compiled.

The path to the compilable image is formed as follows, for example:
C:\Windows\assembly\NativeImages_v4.0.30319_32\Kaspersky\9c87f327866f53aec68d4fee40cde33d\Kaspersky.ni.dll, where C:\Windows\assembly\NativeImages is the path to the image cache in the system;

v4.0.30319_32 is <version.NET Framework>_<processor architecture (32 or 64)>;

Kaspersky is the friendly name of the assembly;

9c87f327866f53aec68d4fee40cde33d is the hash of the application; and

Kaspersky.ni.dll is <friendly name of the assembly>.ni.<extension>.

When creating an image of machine code of the assembly ngen.exe for 64-bit applications, related can be saved in the registry branch HKEY_LOCAL_MACHINE\SOFTWARE\Microsoft\.NETFramework\v2.0.50727\NGenService\Roots, for 32-bit applications in HKEY_LOCAL_MACHINE\SOFTWARE\Wow6432Node\Microsoft\NETFramework\v2.0.50727\N GenService\Roots\.

If the image was installed for an assembly located in the GAC, the branch can be called: . . . \Roots\Accessibility, Version=2.0.0.0, Culture=Neutral, PublicKeyToken=b03f5f7f11d50a3a, processorArchitecture=msil. But if the assembly was not installed in the GAC, then it can be called: . . . \Roots\C:/Program Files (x86)/ATI Technologies/ATI.ACE/Core-Static/A4.Foundation.DLL Prior to Windows 8®, the developer always had to initiate himself the creating, updating and removing of the images of assemblies, making use of ngen.exe (or by configuring the installer). With Windows 8®, images could be created automatically for certain Windows® assemblies.

In one particular case, the Native Image Service is used to control the images. This allows the developers to postpone the installation, updating and removal of images in machine code, these procedures being carried out later on, when the device is standing still. Native Image Service is launched by the program installing the application or the update. This is done by means of the utility ngen.exe. The service works with a queue of requests saved in the Windows® registry, each of the requests having its own priority. The priority established determines when the task will be performed.

In another particular instance, images in machine code are created not only on the initiative of the developers or administrators, but also automatically by the .NET Framework platform. The .NET Framework platform automatically creates an image, tracking the work of the JIT compiler. In general, creating an image during the operation of an application takes too much time, and, therefore, this operation is often carried out later on, for which purpose the CLR environment places the tasks in a queue and executes them during a standstill of the device.

The CLR environment uses the assembly binding module (i.e., the Assemble Binder) to find assemblies for loading at the moment of executing the corresponding assembly. The CLR may use several kinds of binding modules. An image binding module (i.e., a Native Binder) is used to search for images. The searching for a required image is performed in two stages—first, the given module identifies the assembly and image in the file system and, second, the given module checks the correspondence of the image to the assembly.

Figure 3:
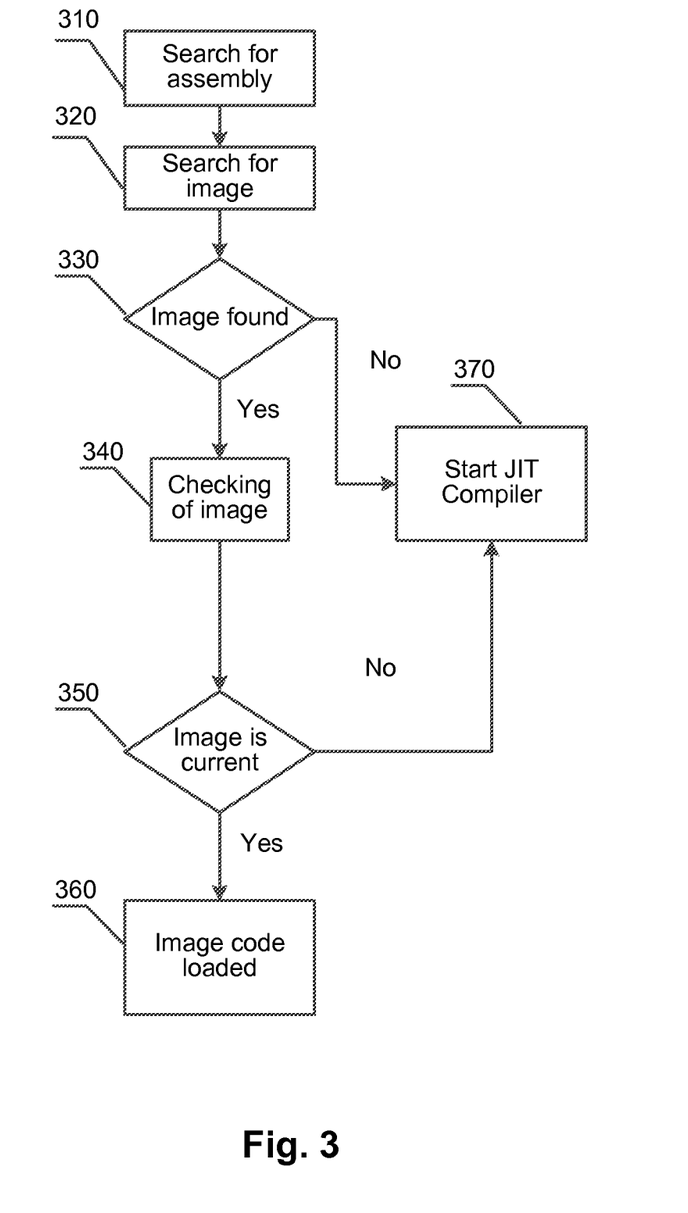
FIG. 3 illustrates a method of operating the binding module.

FIG. 3 illustrates a method of operating the binding module. As shown, in step 310, the assembly binding module searches for the assembly, the search is performed in the GAC, which presupposes that the sought assembly is signed and the content of the assembly is not read; and in the application catalog where the assembly is opened and the metadata is read.

Next, in step 320, the image binding module searches for an image in the NIC corresponding to the identified assembly.

In the event that the image is identified, this is checked in step 330, and the image binding module reads the necessary data and metadata from the image in step 340, to ensure that the image satisfies certain criteria, for which a careful analysis is performed, including, but not limited to, reviewing:

the strong name;
the time of creation (the image should be more recent than the assembly);
the MVID of the assembly and the image;
the .NET Framework version;
the processor architecture; and
the version of related images (for example, the image mscorlib.dll).

If the assembly does not have a strong name, then the MVID is used for the check. At step 350, the image is analyzed to determine whether it is current and control is transferred to the JIT compiler in step 370 if it is not current. Otherwise, the code from the image is loaded in step 360.

It follows from the foregoing description that the number of native images substantially exceeds the number of assemblies and the native images generated by the same parent assembly may differ from one device to another and from one image version to another, all of which greatly complicates the task of categorizing the images. Some conventional file categorization methods use cloud services and the like, but no solutions have been created that are able to correctly and efficiently categorize an image.

SUMMARY

Disclosed are example systems, methods and computer program products for controlling access of a native image of a machine code to resources of an operating system of a computer device. Particularly, the disclosed system and method increases the security of the computer device by restricting the access of untrusted native images to the resources of the operating system.

In one aspect, an example method for controlling access of a native image of a machine code to resources of an operating system of a device includes obtaining, by the hardware processor, the native image of the machine code; identifying, by the hardware processor, a parent assembly from which the native image was created; determining, by the hardware processor, a category of trust of the parent assembly; determining, by the hardware processor, a category of trust of the native image based on the category of trust of the parent assembly; and restricting, by the hardware processor, access of the native image that has an untrusted category of trust to the resources of the operating system of the device.

In another example aspect, the category of trust of the native image corresponds to the category of trust of the parent assembly.

In another example aspect, the method further includes: determining a correspondence between the native image and the parent assembly; and determining, based on the determined correspondence, whether the native image is modified.

In another aspect, an example method for controlling access of a native image of a machine code to resources of an operating system of a device includes: restricting, by a hardware processor, writing access to the native image of the machine code; identifying, by the hardware processor, a parent assembly which was used to create the native image having a restricted writing access; updating, by the hardware processor, the native image based on the parent assembly; determining, by the hardware processor, a category of trust of the parent assembly; assigning, by the hardware processor, a category of trust of the parent assembly to the updated native image; and restricting, by the hardware processor, access of the updated native image that has an untrusted category of trust to the resources of the operating system of the device.

In another example aspect, writing access is restricted to all processes except for ngen.exe.

In another example aspect, updating of the native image of the machine code includes replacing the native image having the restricted writing access with a new native image of the machine code of the parent assembly.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for controlling access of a native image of a machine code to resources of an operating system of a device. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 4:
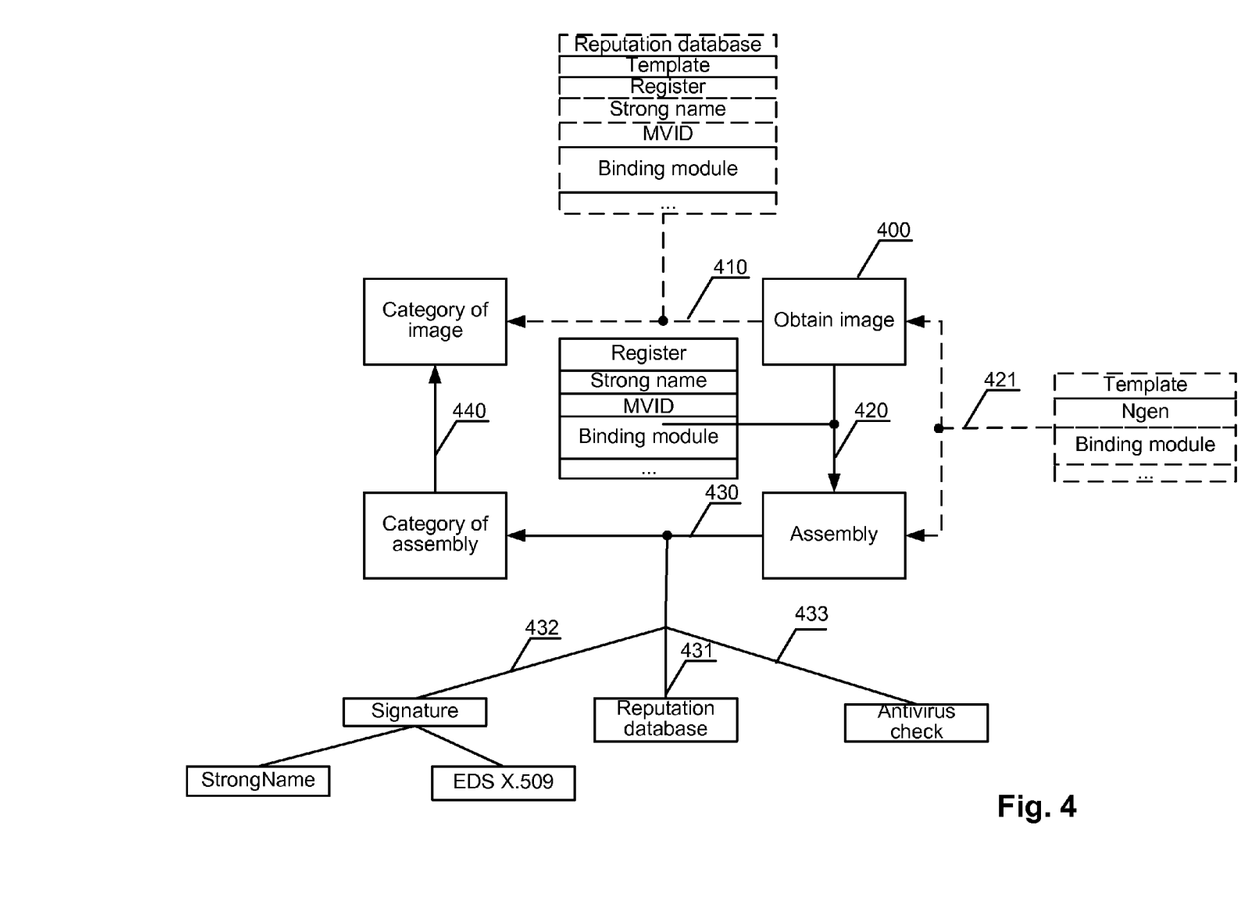
FIG. 4 illustrates an exemplary method of categorizing images according to one aspect.

FIG. 4 illustrates an example method of categorizing images according to one aspect. As shown, in step 400, an image is obtained. In one example, the image may be obtained from the native image cache "NIC" (e.g., if the image is installed on a device and being used as intended on the device), and, in another example, the image may be obtained from any other image repository (such as when the device is being used as storage and the images are not being used as intended on the device). Next, in step 410, the category of trust of the image is determined. In one example aspect, a request is made to a database to determine the category of trust of the image, where, the checksum of the image can be used. In another example aspect, the MVID of the image can be used. Templates are also used to determine the category of the image. The mechanism of working with templates is discussed in more detail below.

If the image is not known in the database, then, in step 420, the parent assembly from which the image was created is determined. To determine the parent assembly, at least the following data, data structures and mechanisms may be used: MVID, registry (e.g., Windows Registry), binding module, and strong name.

In one example aspect, a determination by the MVID may be used, for example, when a database exists containing the MVIDs of the assemblies existing on the current device. In this aspect, the MVID of the image may be identified in the database containing the MVIDs of the assemblies.

In another example aspect, the parent assembly may be determined from the entries in the registry when an entry in the registry is created during the creation of the image(s). An example of such an entry is discussed in more detail above. In one example aspect, the entry may contain information about the path to the parent assembly, information about the native image and a various ancillary data. By comparison of data from the registry and data obtained from the analyzed image, a parent assembly may be identified.

In another example aspect, the parent assembly may be determined from the strong name used for images created from strong-named assemblies. The components of the strong name of the parent assembly are extracted from the image, the strong name is generated, and on the basis of this data, the path is determined to the parent assembly in the GAC on the device or in a database saving the assemblies in an orderly manner according to the strong names.

The process to determine the parent assembly depends on a number of factors, which may include, for example, the location of the parent assembly and the image (e.g., the user's device or a remote or local database), the possibility of compromising the assembly and the image at their place of storage, the method of naming the assembly (strong name or ordinary name), and so on.

In one example aspect, after the parent assembly has been determined, the correspondence between the native image and the assembly is determined in step 421. This step is performed if there is a likelihood that the native image (after being created) might have been altered without authorization (e.g., it may be compromised, corrupted or the like) at the storage location. In one example aspect, an algorithm may be employed to determine the correspondence that uses an image binding module (discussed above). In another example aspect, after the parent assembly has been determined, an image from this assembly (i.e., original native image, which is a guaranteed unmodified image) may be created and directly compared with the native image being analyzed to determine the correspondence. In one example aspect, the comparison can be performed on byte by byte basis.

In one example aspect, in order to prevent unauthorized alterations of images, the modification of the images is allowed only to trusted processes, such as ngen.exe only, for example, while other processes are only permitted to read data from the native image.

In one example aspect, the mechanism of templates may be employed to determine the correspondence between an image and the parent assembly. In one example aspect, if there is no correspondence between the parent assembly and the corresponding native image, the image is considered to be compromised (i.e., malicious). A compromised image may differ from the original image by the CIL code, the machine code, the metadata of the types, the information contained in the CLR and PE headers and the like.

Figure 5:
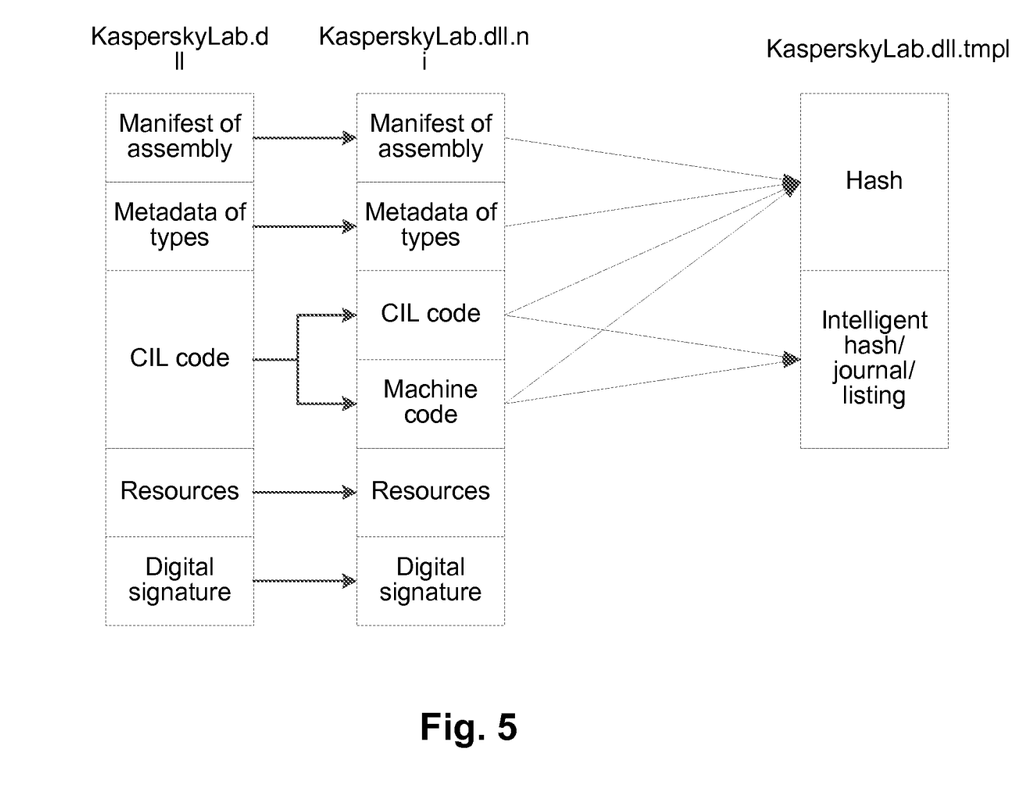
FIG. 5 illustrates an exemplary structure of an image according to one aspect.

FIG. 5 illustrates an exemplary structure of a native image according to one aspect. The native image, like the parent assembly, has a certain structure. For example, the assembly KasperskyLab.dll and the image KasperskyLab.ni.dll contain metadata and code, where the assembly contains exclusively CIL code, while the native image in a particular aspect also contains machine code and the structure NativeImageHeader. On the basis of the structure, the metadata, and the code, the template KasperskyLab.dll.tmpl (discussed above) is generated and associated (i.e., correspondence established) with the parent assembly and the image created from it. To bind the structure, the code and the metadata into a template, the exemplary system and method uses, for example, the intelligent hash technique (also known as local sensitive hash). In one example aspect, the template is generated as shown in FIG. 5.

More particularly, data (i.e., the manifest, the metadata, the CIL code, and the like) is extracted from the assembly. The same data as well as the machine code are extracted from the native image. The data, which is unchanged for each of the possible versions of the image created from the same parent assembly, is processed (for example, the check sum is calculated from it) and the hash is formed and placed in the template. The data, which changes from one version to another of the image, such as the machine code, is also processed and an intelligent hash is generated accordingly. In a particular aspect, a function call journal for the machine code is generated, a listing with disassembled machine code, or any other entity reflecting the logic of implementation of the given machine code; and the intelligent hash is formed from these entities. In another particular aspect, these entities are used directly in the template. It should be noted that the template is formed so as to unambiguously relate (establish the correspondence of) the parent assembly and the image, regardless of the image versions depending on the software and hardware configuration of the device. In the event that changes have been made in the machine code of the image, and the logic of execution of the image code ceases to correspond to the logic of execution of the assembly code, no correspondence is established between the parent assembly and the image on the basis of the template, and the image is determined to not correspond to the assembly.

An example of determining correspondence using a template is described in more detail below. For example, if a certain parent assembly Kaspersky.dll exists, and the image Kaspersky.ni.dll is created for it on a device. The template Kaspersky.dll.tmpl is formed, making it possible to establish the correspondence between the parent assembly and the image. Then, on the device, the software and hardware is updated (i.e., updating of the operating system, .NET Framework, processor replacement and the like) and the version of the image Kaspersky.ni.dll is rendered no longer current. Thus, the image cannot be used, an updating of this image is initiated and a new image Kaspersky.ni.dll is created, which differs from the image of the previous version. When the template is used, it is found that the updated image corresponds to the parent assembly (i.e., the logic of execution of the machine code remains the same). In another case, a malicious program is installed on the device, which modifies the image Kaspersky.ni.dll. In this instance, when the template is used, it is determined that the image modified by the malicious program does not correspond to the parent assembly (e.g., the logic of execution of the machine code differs from the logic embedded in the parent assembly).

Referring back to FIG. 4, after determining the parent assembly, the category of trust of the assembly is established step 430). A category of trust of an assembly is the degree of trust in the assembly (trusted or untrusted) on the part of the protection system of the device, such as an antivirus application. In one example aspect, there are two possible categories of assemblies: a trusted assembly or an untrusted assembly. In the context of the current disclosure, one should distinguish the concept of category of an assembly from the concept of danger status of the assembly. The danger status of an assembly in the context of the present disclosure can be: dangerous or not dangerous. There are also unknown assemblies of which the danger status has not been determined. The danger status of an assembly determines the danger of an assembly to the device on which that assembly is installed. The danger of an assembly to a device includes, in one example aspect, the possibility of theft of data from the device, substitution of data, or unauthorized modification of the software of the device during the execution of the code of the assembly.

Trusted assemblies include assemblies that are not dangerous as determined by the protection system. In particular, the protection system of the device, in assigning a category of trust to an assembly, does so locally in the context of the current state on the device and on the basis of information about the assembly. In one particular aspect, such information is the danger status of the assembly. The danger status of an assembly may be determined by using identification information of the assembly, such as the MVID of the assembly, the strong name of the assembly, the check sum of the assembly and the like. For this, a request is organized to a reputation database in step 431. In one aspect, the database resides on the device on which the assembly is stored and in another aspect the base resides remotely. If the assembly is known (i.e., information about it is contained in the reputation database), then the assembly already has a danger status of not dangerous or dangerous, accordingly, depending on the information from the reputation database. If the identification information of the assembly is not contained in the database, the assembly is considered to be unknown, i.e., the assembly does not have a status (i.e., status undetermined). If the assembly has a not dangerous status, then in one particular aspect the assembly receives the category of trusted. In another particular aspect, the category of the assembly is determined from other factual and statistical information about the assembly, for example, by way of installing the assembly on a device or its affiliation with installed packages whose danger status is known.

In a particular aspect, the factual information about the assembly is information about the digital signature (for example, the StrongName of the signature or X.509). In this case, the digital signature should be validated. For validation in step 432, identification information is obtained about the digital signature of the assembly, which contains information about the manufacturer or the hash of the file or parts thereof, for example. The signature may be located either in the assembly or in the catalog (i.e., catalog signature). The danger status of the digital signature of an assembly is determined by using the identification information of the signature, for which an inquiry is organized to a reputation database. If the signature is known (i.e., information about the signature is contained in the reputation database), then the signature already has a status of not dangerous or dangerous. If the identification information of the signature is not contained in the database, the signature is considered to be unknown, i.e., the signature does not have a status (i.e., status unknown). In a particular aspect, if the signature has the status not dangerous, then in a particular aspect the assembly is given the category of trusted, and if the signature has the status dangerous, then in a particular aspect the assembly is given the category of untrusted.

Status is assigned to signatures in various ways. In one particular aspect, the status of the signatures depends on the manufacturer. In another aspect, the status of the signatures is assigned by inheritance from the installer, whose signature status is known. In another aspect, the status of a signature is assigned depending on the popularity of the signature, for example, the more popular the signature, the higher level of trust is assigned.

In one example aspect, at step 433, the category of trust is determined by an antivirus checking of the assembly, for which various methods are used to detect a malicious program, including signature, heuristic, statistical, and the like. In this aspect, if the assembly is found to be not dangerous from the results of the antivirus check, the assembly receives the category of trusted. Otherwise, the assembly is considered untrusted.

After determining the category of trust of the assembly, in step 440, the category of trust of the image is determined. In a particular aspect, the image is assigned the category of trust determined for the parent assembly. In another aspect, the category of the image is determined by the method described above for step 410.

When a protection system is installed on the device, the exemplary system and method confirms that the repository of images has not been and will not be changed without authorization according to an exemplary aspect.

Figure 6:
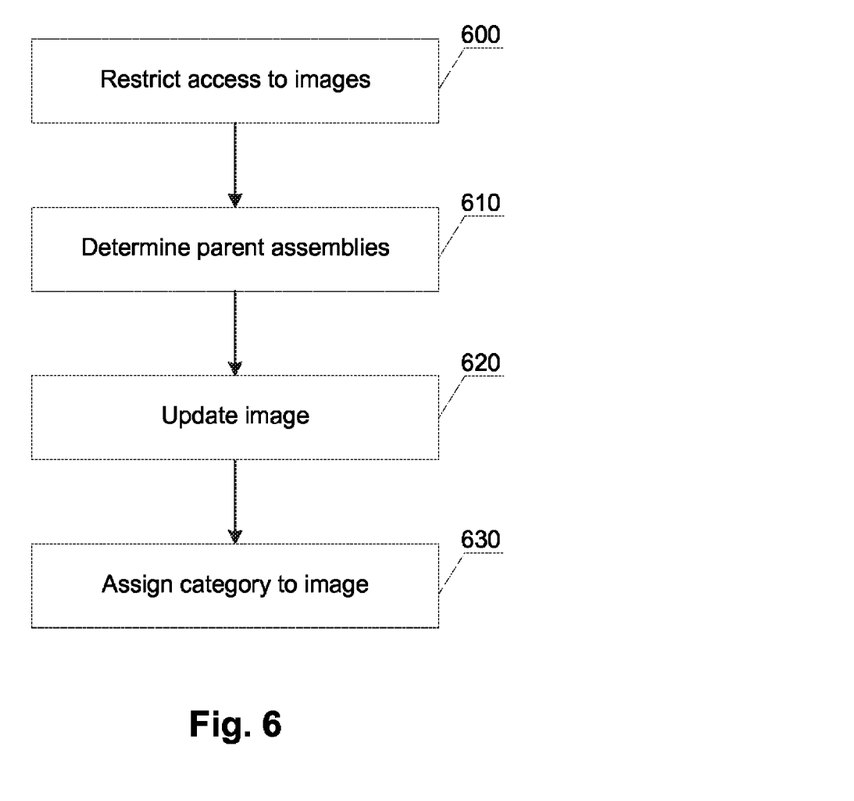
FIG. 6 illustrates an exemplary method for assigning a category to an image according to one aspect.

FIG. 6 illustrates an example method for assigning a category to an image. As shown, in step 600, access is limited to the repository of images or at least to one image. In one aspect, the restricting comprises only allowing trusted processes or a finite number of certain trusted processes to modify an image, such as only the process ngen.exe, all other processes being only allowed read access. In another particular aspect, the restricting includes total blocking of access to write into the repository as a whole or at least to one image.

Next, in step 610, the parent assembly used to create the image whose access has been restricted is determined. In step 620, at least one image is updated (e.g., replaced by another image). In one particular aspect, the updating includes in removing a previously created image and creating a new image by the operating system (e.g., by running ngen.exe on the parent assembly or by an automatic image creation service). In another aspect, only part of the image data is updated, such as the machine code, and the updating is done by trusted processes. In the first case, the image after its removal is created anew. In one particular aspect, this is performed immediately, and in another case, the creation is postponed for a certain length of time, for example, until the running of the parent assembly, as determined in step 610, of the image being updated. In step 630 the category of the parent assembly is assigned to the image.

The antivirus application uses categories of trust in its operation, for example, it removes native images having a category of trust of untrusted, or substantially restricts their use, for example, it limits their access to the resources provided by the operating system.

In one example aspect, the antivirus application may perform antivirus scan of detected parent assembly, and exclude the native image of the machine code from the antivirus analysis, but associate results of the antivirus scan of the parent assembly with the native image of the machine code. This improves the performance of antivirus analysis of the computer system, when only parent assemblies are being scanned, while the created from them native images of machine code will inherit the category of trust and/or danger status (the verdict) of the assembly. Therefore antivirus scan of the native images is not performed.

Figure 7:
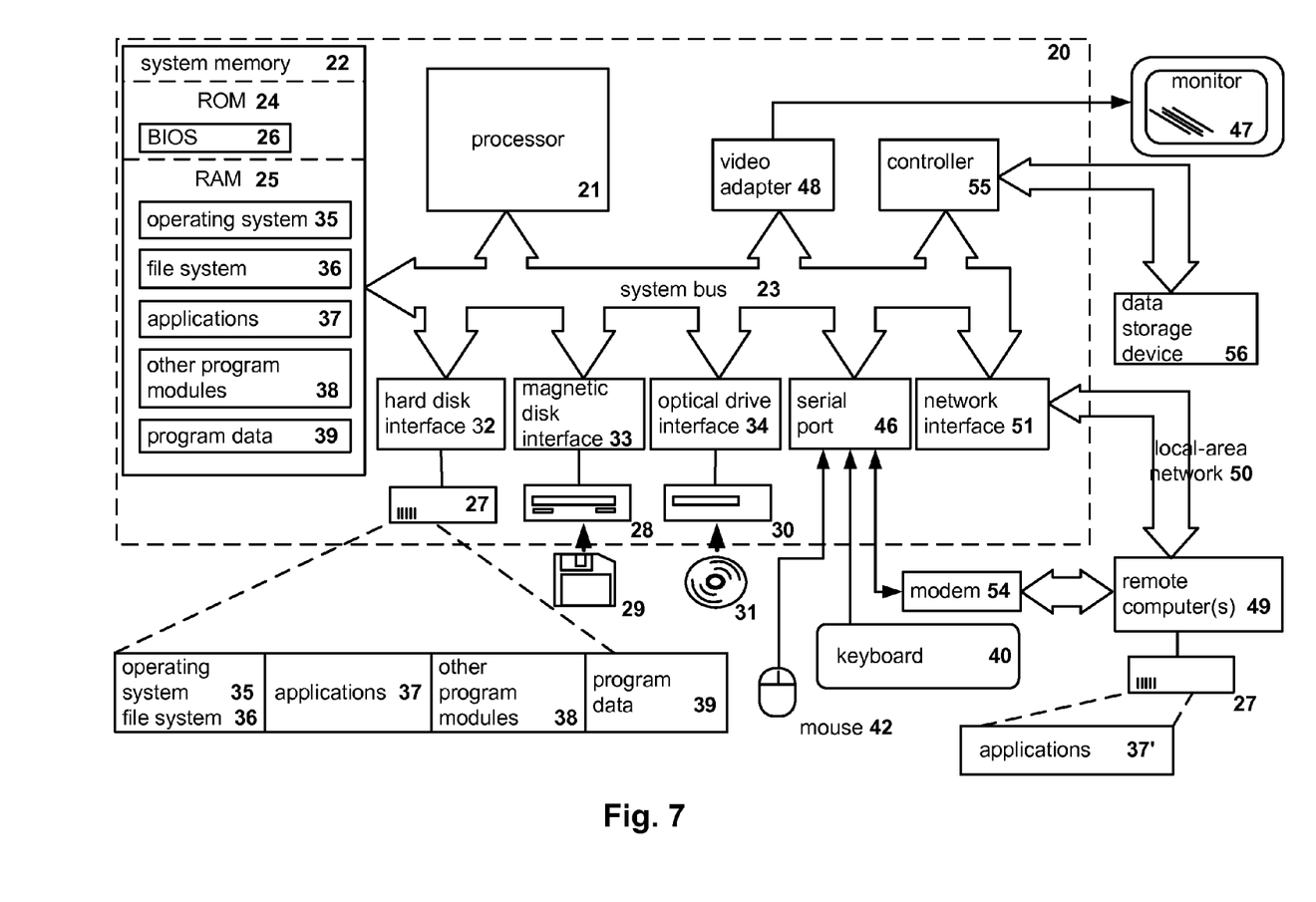
FIG. 7 illustrates an example of a general-purpose computer system on which the disclosed systems and method can be implemented.

FIG. 7 illustrates an example of a general-purpose computer system (which may be a personal computer or a server) on which the disclosed systems and method can be implemented according to an example aspect. As shown, the computer system includes a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate in a network environment, using a network connection to one or more remote computers 49. The remote computer (or computers) 49 are also personal computers or servers having the majority or all of the aforementioned elements in describing the nature of a personal computer 20, as shown in FIG. 4. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 6 above). Accordingly, each module can be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for controlling access of a native image of a machine code to resources of an operating system of a device, the method comprising:
   restricting, by a hardware processor, writing access to the native image of the machine code;
   identifying, by the hardware processor, a parent assembly which was used to create the native image having a restricted writing access;
   updating, by the hardware processor, the native image by replacing at least a part of the native image with a new native image based on the parent assembly;
   determining, by the hardware processor, a category of trust of the parent assembly;
   assigning, by the hardware processor, a category of trust of the parent assembly to the updated native image; and
   restricting, by the hardware processor, access of the updated native image that has an untrusted category of trust to the resources of the operating system of the device.

2. The method of claim 1, wherein writing access is restricted to all processes except for ngen.exe.

3. The method of claim 1, wherein updating of the native image of the machine code further includes replacing the native image having the restricted writing access with a new native image of the machine code of the parent assembly.

4. The method of claim 1, wherein the category of trust of the native image corresponds to the category of trust of the parent assembly.

5. The method of claim 1, further comprising:
   determining a correspondence between the native image and the parent assembly; and
   determining, based on the determined correspondence, whether the native image is modified.

6. A system for controlling access of a native image of a machine code to resources of an operating system of a device, the system comprising:
   a hardware processor configured to:
   restrict writing access to the native image of the machine code;
   identify a parent assembly which was used to create the native image having a restricted writing access;
   update the native image by replacing at least a part of the native image with a new native image based on the parent assembly;
   determine a category of trust of the parent assembly;
   assign a category of trust of the parent assembly to the updated native image; and
   restrict access of the updated native image that has an untrusted category of trust to the resources of the operating system of the device.

7. The system of claim 6, wherein writing access is restricted to all processes except for ngen.exe.

8. The system of claim 6, wherein updating of the native image of the machine code further includes replacing the native image having the restricted writing access with a new native image of the machine code of the parent assembly.

9. The system of claim 6, wherein the category of trust of the native image corresponds to the category of trust of the parent assembly.

10. The system of claim 6, wherein the processor is further configured to:
    determine a correspondence between the native image and the parent assembly; and
    determine, based on the determined correspondence, whether the native image is modified.

11. A non-transitory computer readable medium storing computer executable instructions for controlling access of a native image of a machine code to resources of an operating system of a device, including instructions for:
    restricting writing access to the native image of the machine code;
    identifying a parent assembly which was used to create the native image having a restricted writing access;
    updating the native image by replacing at least a part of the native image with a new native image based on the parent assembly;
    determining a category of trust of the parent assembly;
    assigning a category of trust of the parent assembly to the updated native image; and
    restricting access of the updated native image that has an untrusted category of trust to the resources of the operating system of the device.

12. The non-transitory computer readable medium of claim 11, wherein writing access is restricted to all processes except for ngen.exe.

13. The non-transitory computer readable medium of claim 11, wherein updating of the native image of the machine code further includes replacing the native image having the restricted writing access with a new native image of the machine code of the parent assembly.

14. The non-transitory computer readable medium of claim 11, wherein the category of trust of the native image corresponds to the category of trust of the parent assembly.

15. The non-transitory computer readable medium of claim 11, further comprising instructions for:
    determining a correspondence between the native image and the parent assembly; and
    determining, based on the determined correspondence, whether the native image is modified.

* * * * *